(12) United States Patent
Shuster et al.

(10) Patent No.: US 9,007,362 B2
(45) Date of Patent: Apr. 14, 2015

(54) ADAPTABLE GENERATION OF VIRTUAL ENVIRONMENT FRAMES

(76) Inventors: Brian Mark Shuster, Vancouver (CA); Aaron Burch, Vancouver (CA); Gary S. Shuster, Fresno, CA (US)

( * ) Notice: Subject to any disclaimer, the term of this patent is extended or adjusted under 35 U.S.C. 154(b) by 471 days.

(21) Appl. No.: 13/352,311

(22) Filed: Jan. 17, 2012

(65) Prior Publication Data
US 2012/0188233 A1 Jul. 26, 2012

(51) Int. Cl.
*G06T 15/00* (2011.01)
*G06T 15/20* (2011.01)
*G06F 3/00* (2006.01)

(52) U.S. Cl.
CPC . *G06T 15/20* (2013.01); *G06F 3/00* (2013.01); *G06T 2200/16* (2013.01)

(58) Field of Classification Search
CPC ........ G06F 3/00; G06T 15/20; G06T 2200/16
USPC ........................... 345/419, 420, 473, 474, 475
See application file for complete search history.

(56) References Cited

U.S. PATENT DOCUMENTS 6,313,838 B1 * 11/2001 Deering ......................... 345/420
7,936,355 B2 * 5/2011 Moravanszky et al. ........ 345/473

* cited by examiner

*Primary Examiner* — Phu K Nguyen
(74) *Attorney, Agent, or Firm* — Jonathan Jaech; Snell & Wilmer L.L.P.

(57) ABSTRACT

A virtual environment in generated in a server where at least one object representative of an entity interacts with other objects or attributes of the environment. A desired frame rate for rendering the virtual environment is identified, and compared to a maximum achievable frame rate at a client device. If the maximum achievable frame rate is slower than the desired frame rate, the number of objects displayed within the virtual environment is modified, in accordance with one or more rule sets, until the maximum achievable frame rate is at or near the desired frame rate. In addition, a server may provide and synchronize output for clients participating in the virtual environment using different target frame rates.

17 Claims, 5 Drawing Sheets

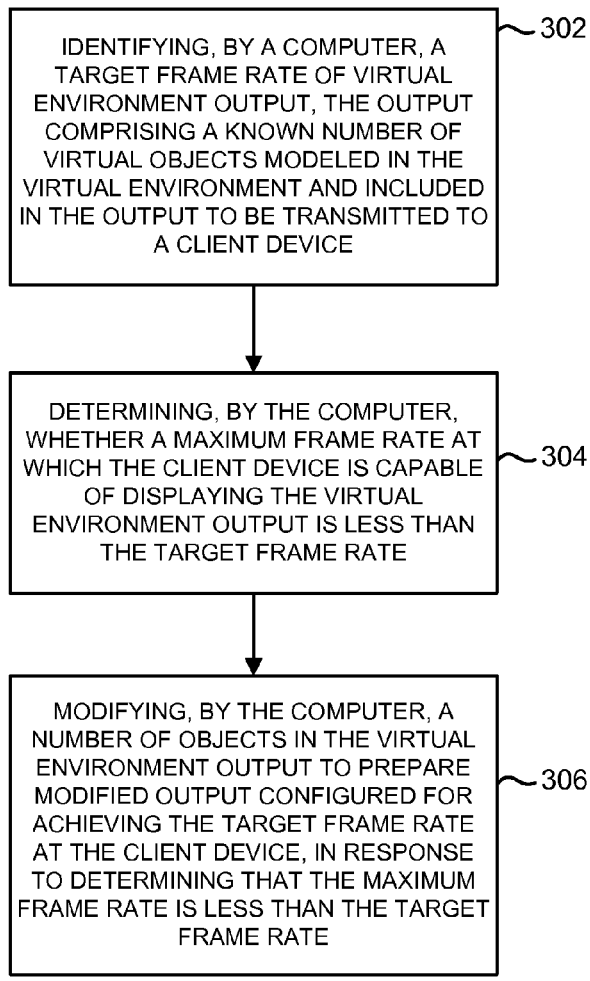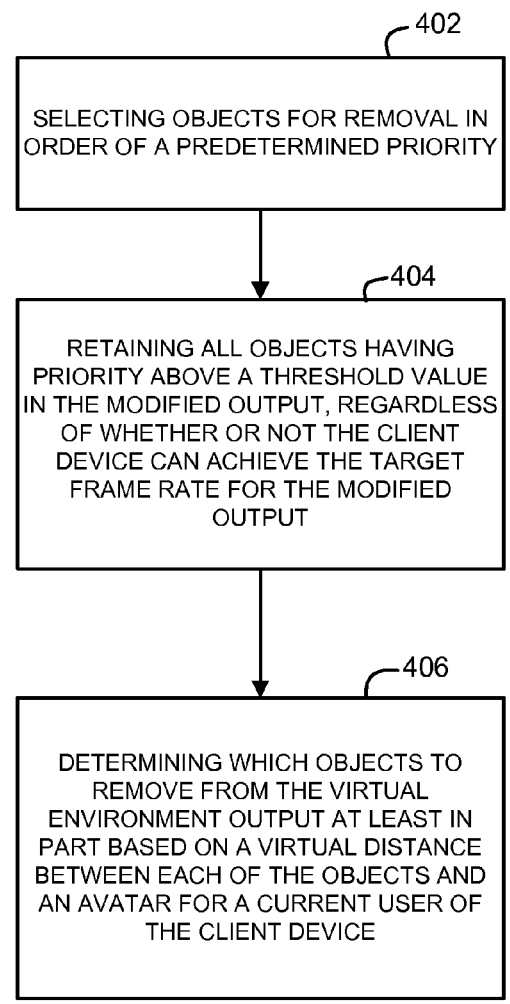

502 DEFINING THE TARGET FRAME RATE IN RESPONSE TO USER INPUT TO THE CLIENT DEVICE

504 MODIFYING THE TARGET FRAME RATE FOR AT LEAST ONE CLIENT, BY PERIODICALLY REMOVING A NON-CRITICAL FRAME FROM THE VIRTUAL ENVIRONMENT OUTPUT TO PREPARE THE MODIFIED OUTPUT

506 DEFINING THE TARGET FRAME RATE DIFFERENTLY FOR DIFFERENT CLIENT DEVICES BASED ON MAXIMUM FRAME RATES FOR RESPECTIVE ONES OF THE DIFFERENT CLIENT DEVICES

508 SERVING MULTIPLE OUTPUT STREAMS ACCORDING TO DIFFERENT TARGET FRAME RATES FOR THE RESPECTIVE ONES OF THE DIFFERENT CLIENT DEVICES

510 SYNCHRONIZING THE DIFFERENT TARGET FRAME RATES TO A BASELINE FRAME RATE OF THE VIRTUAL ENVIRONMENT OUTPUT

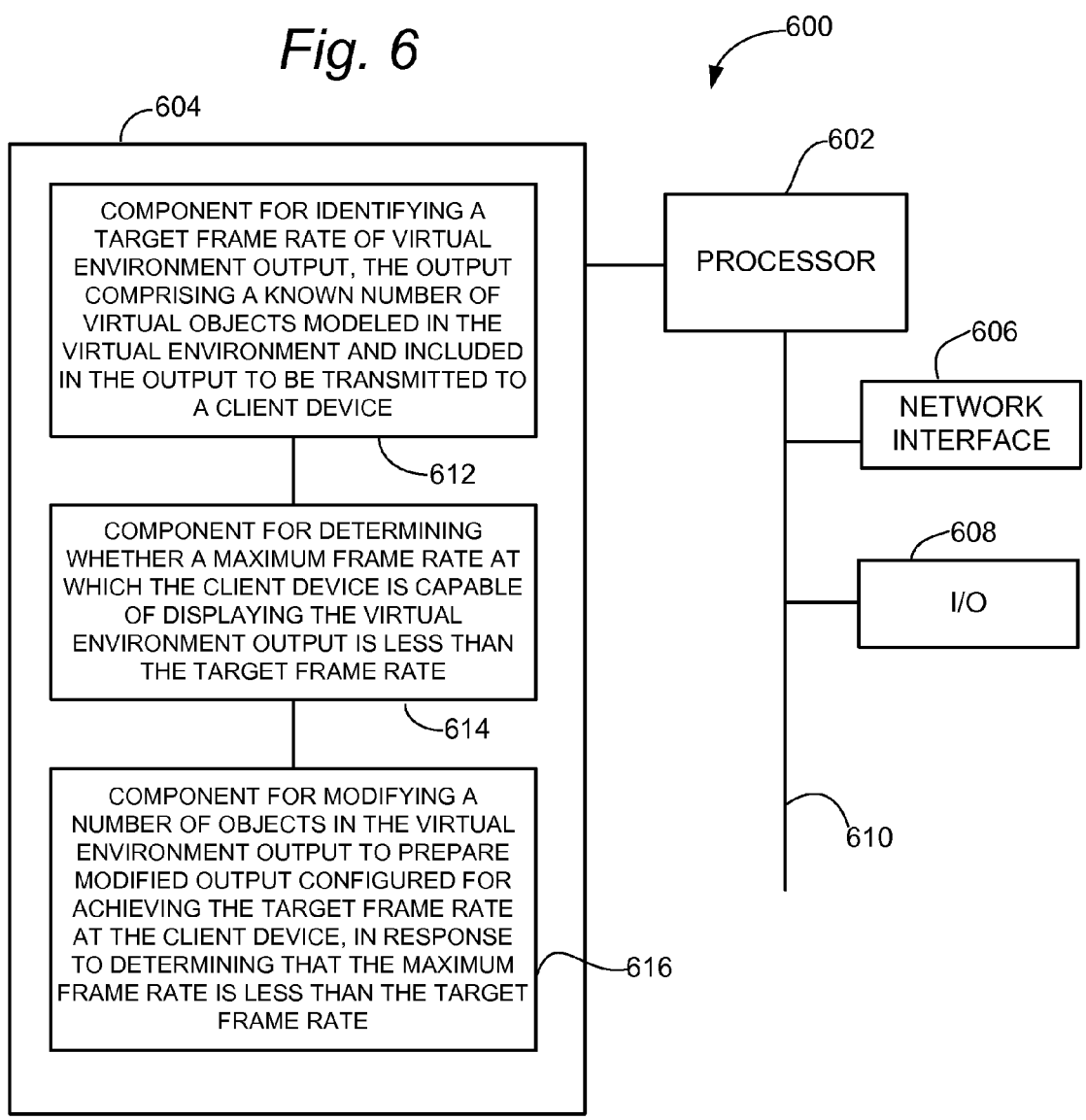

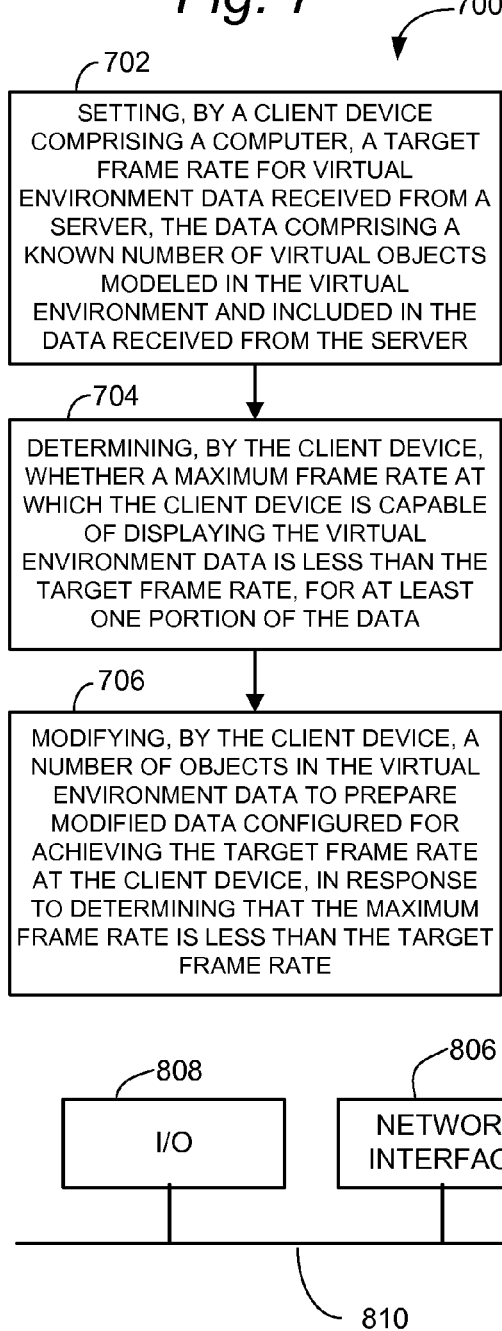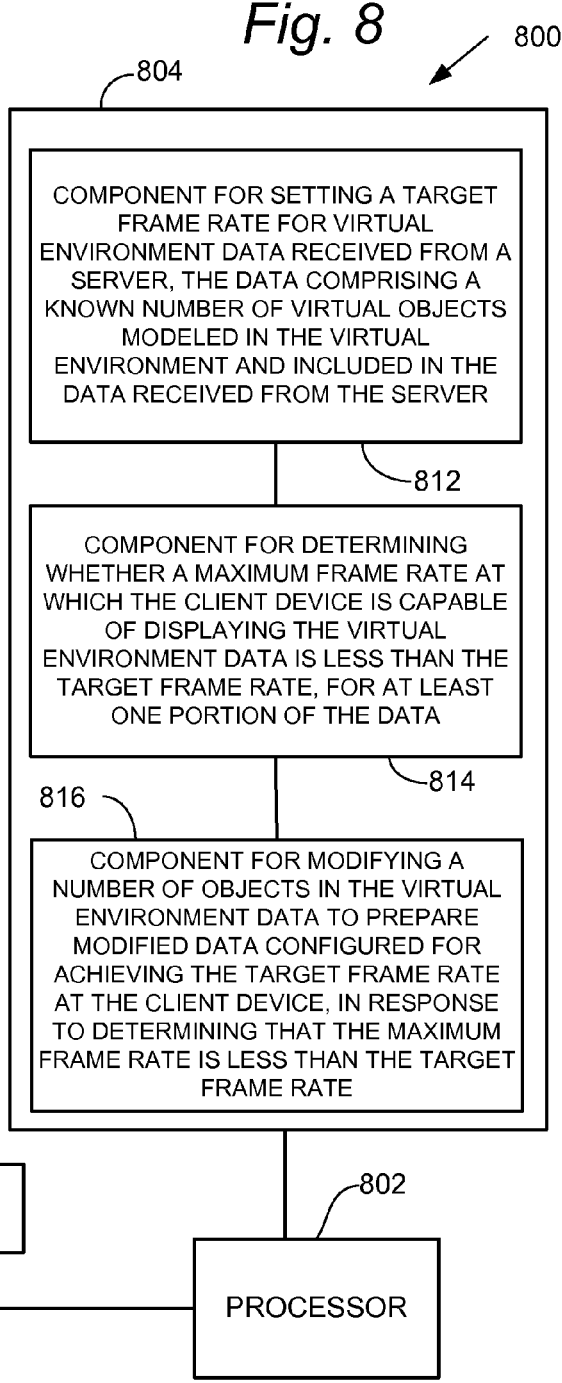

ADAPTABLE GENERATION OF VIRTUAL ENVIRONMENT FRAMES

CROSS-REFERENCE TO RELATED APPLICATION

This application claims priority pursuant to 35 U.S.C. §119 (e) to U.S. provisional application Ser. No. 61/433,073, filed Jan. 14, 2011, which is hereby incorporated by reference, in its entirety.

BACKGROUND

1. Field

This application relates to methods and systems for hosting a multi-user virtual environment, and to using data for a multi-user virtual environment provided by a host computer.

2. Description of Related Art

Virtual environments, such as those operated on the Utherverse™ VWW platform or on Linden Lab's Second Life, attempt to model the virtual environment after that of the real world. Just like in the physical world, a single person is typically represented by a representative element, such as an avatar. Some virtual environments are rendered in a manner that does not render an avatar for the player, instead presenting the environment as if viewed through the player's eyes. In such environments, other players and/or non-player elements are able to recognize the player's avatar, although the player's own avatar is invisible or rendered partially to the player. Such a rendering scheme mimics the actual point of view through human eyes.

A virtual environment, virtual world, virtual reality, and similar terms may be used to refer to a computer process modeling an interactive, multi-dimensional (typically three or two geometric dimensions plus a time dimension) model hosted by one or more computer servers in communication with multiple client devices operated by different users. Such a computer process may also be described as a multiplayer online game or similar terms. The computer server may operate as an aggregation engine that aggregates input from multiple client devices and serves aggregated output to the participating clients at periodic intervals. Each instance of aggregated output may be referred to as a frame, and more specifically as a "virtual environment frame"; typically, however the aggregated output is not formatted as a conventional video frame. Instead, each virtual environment frame may define a state of the modeled environment at a particular point in time, with reference to locations and/or objects in the modeled environment for which geometric a graphic texture data is stored locally at each client. The virtual environment frame may also include object geometric data or textures for new objects that have not yet been stored at a local client, and other information. Each client device may receive the virtual environment frame and render one or more video frames displaying a viewpoint of the virtual environment that may be controlled locally at the client device. The frequency at which the virtual environment server aggregates the input and serves a corresponding virtual environment frame may be referred to as a frame rate.

The complexity of generating a rendering a viewpoint of a modeled environment for output at the client may vary based on events and location in the virtual world. Therefore, a client device may sometimes be unable to generate and render certain output frames as quickly as it receives each virtual environment frame from the server. This failure may cause perceptible lag at the client, resulting in loss of synchronization with the online multiplayer process. At other times, the same client device may be able to generate and render output frames as quickly as necessary to maintain synchronicity. It would be desirable, therefore, to provide a solution to enable client devices to keep up with the hosted process regardless of the complexity of a particular scene, without adversely impacting the user experience of the online environment generally.

SUMMARY

Methods and systems for adaptable generation of virtual environment frames are described in detail in the detailed description, and certain aspects are described or summarized below. This summary and the following detailed description should be interpreted as complementary parts of an integrated disclosure, which parts may include redundant subject matter and/or supplemental subject matter. Omissions in either section do not indicate priority or relative importance of any element described in the integrated application. Differences between the sections may include supplemental disclosures of alternative embodiments or additional details, or alternative descriptions of identical embodiments using different terminology, depending on the nature of the differences as should be apparent from the applicable context.

In an aspect, a method for adaptable generation of virtual environment frames in a virtual environment may be performed by a computer, comprising operations as follows. The computer may comprise a virtual environment server, a client computer, or some combination of client and server computers. The method may include identifying, by the computer, a target frame rate of virtual environment output, the output comprising a known number of virtual objects modeled in the virtual environment and included in the output to be transmitted to a client device. The method may further include determining, by the computer, whether a maximum frame rate at which the client device is capable of displaying the virtual environment output is less than the target frame rate. The method may further include modifying, by the computer, a number of objects in the virtual environment output to prepare modified output configured for achieving the target frame rate at the client device, in response to determining that the maximum frame rate is less than the target frame rate. Accordingly, the client may have an increased likelihood of experiencing the target frame rate without un undesired degradation of content.

In an aspect, the method may include the computer selecting objects for removal in order of a predetermined priority. In addition, the method may include the computer retaining all objects having priority above a threshold value in the modified output, regardless of whether or not the client device can achieve the target frame rate for the modified output. In an aspect of the method, the objects may include at least one avatar displayed within the virtual environment subject to having its display status altered in order to achieve a target frame rate. In another aspect, the objects may include at least one non-avatar prop displayed within the virtual environment subject to having its display status altered in order to achieve a target frame rate. Instead of, or in addition to using a predetermined priority, the method may include determining which objects to remove from the virtual environment output at least in part based on a virtual distance between each of the objects and an avatar for a current user of the client device.

In another aspect, the method may include defining the target frame rate in response to user input to the client device. In addition, the method may include modifying the target frame rate for at least one client, by periodically removing a non-critical frame from the virtual environment output to prepare the modified output. Accordingly, the method may include defining the target frame rate differently for different client devices based on maximum frame rates for respective ones of the different client devices. In such case, the method may include serving multiple output streams according to different target frame rates for the respective ones of the different client devices. In addition, the method may include synchronizing the different target frame rates to a baseline frame rate of the virtual environment output.

In related aspects, an apparatus for adaptable generation of virtual environment frames may include a processor coupled to a memory and a network interface, the memory holding instructions that when executed by the processor cause the apparatus to perform any of the methods and aspects of the methods summarized above or described elsewhere herein. Certain aspects of such apparatus (e.g., hardware aspects) may be exemplified by equipment such as a network interface for network communications. Similarly, an article of manufacture may be provided, including a non-transitory computer-readable storage medium holding encoded instructions, which when executed by a processor, may cause a specialty device configured as an virtual reality server or client node to perform ones of the methods and aspects of the methods described herein.

Further embodiments, aspects and details of the method and apparatus for adaptable generation of virtual environment frames based on client processing metrics or other feedback are presented in the detailed description that follows.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. These drawings are provided to facilitate the reader's understanding of the technology and shall not be considered limiting of the breadth, scope, or applicability of the technology.

FIGS. 3-5 are flow charts illustrating aspects of a method for adaptable generation of virtual environment frames in a multi-user virtual environment, including operations performed by a computer server, computer client, or both.

FIG. 6 is a block diagram illustrating aspects of an apparatus for adaptable generation of virtual environment frames in a multi-user virtual environment.

FIG. 7 is a flow chart illustrating aspects of a method for adaptable generation of virtual environment frames in a multi-user virtual environment, including operations performed by a computer client.

FIG. 8 is a block diagram illustrating aspects of an apparatus for adaptable generation of virtual environment frames in a multi-user virtual environment.

DETAILED DESCRIPTION

Figure 1:
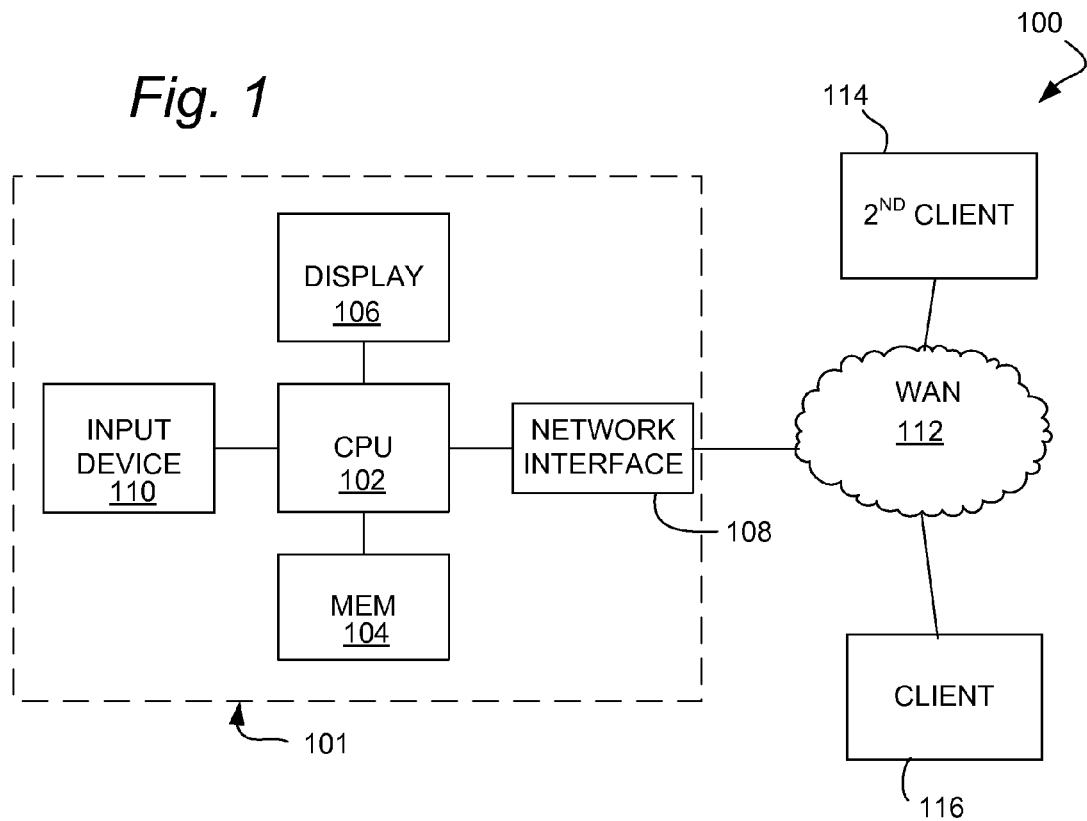
FIG. 1 is a block diagram showing an example of a system for adaptable generation of virtual environment frames in a multi-user virtual environment.

The present disclosure is directed to adaptable generation of virtual environment frames in a virtual environment, for example by dynamically altering rules for rendering the virtual environment to maintain a desired frame rate or to enable participation in a multi-user process by clients rendering the environment at different frame rates.

It should be understood in this discussion that certain terms are used for convenience, but that the scope of the disclosure is not to be limited by the common definition of such terms. The following terms are used herein: "Avatar" typically refers to a personal representation of a user within a virtual world, which may or may no resemble a likeness of a human being or fantasy creature. As used herein, the term additionally includes any element of a virtual world that represents a personal projection of a user and is controlled at least in part by that user. "Operator" or "user" means a person, a related group of people, one or more computer processes, or a combination of one or more persons and one or more computer processes, which (solely or in concert) control a user account. "User account" means an account for access to a virtual world, including an account that corresponds to one or more virtual representatives of that account. A user account may also include an account associated with the operation of a business or other entity within a virtual world. It should also be understood that the display of each avatar may include an avatar located in a different part of the virtual world than other avatars, often sufficiently virtually distant that the commonly-controlled avatars cannot see or hear each other. The term "rendering" is used in two ways in this disclosure. "Rendering", when the context requires, refers specifically to the quality with which graphic elements are drawn, or rendered for output on a computer graphics display. When the context requires, however, the term may refer to the overall display of the virtual environment.

A critical element for avoiding motion sickness (particularly in environments rendered in 3D) and for rendering a pleasing and realistic visual representation of a virtual environment is the "frame rate". The frame rate is the rate at which the elements of the virtual environment are updated in periodic cycles, which may be but is not necessarily synchronized to a video frame rate. The existing art treats the frame rate as a single number, the rate at which the entire rendering of the environment is updated. It is known in the art to transmit only the changed portions of the environment. This type of partial update has been widely used in the field of moving image compression.

In most games and other virtual environments, the designers are able to predict and control the way the user interacts with the environment, the elements within the environment, the number and type of inputs to the environment, and in many cases even the hardware used for rendering the environment. However, as systems are created that attempt to model the real world, or to import some of the elements of choice present within the real world into an unreal environment, the designers lose the ability to control or predict how users will interact with the environment, or even which elements will be present within the environment. As the elements in the virtual environment become more freely elected, created, or modified by users, the creators of the virtual environment have an option not readily available within the real world: alteration of the laws governing perception and physics.

FIG. 1 is a block diagram showing an example of virtual reality environment system 100 such as may be used to perform methods described herein. System 100 may comprise, for example, a computer 101 including at least a processor or CPU 102 and a memory 104 for holding data and program instructions. When executed by the CPU 102, the program instructions may cause the computer 101 to perform one or more method and operations as disclosed herein. The computer 101 may further comprise or be operatively coupled to a display device 106 for providing a graphical or text display of software output, for example, a computer monitor or flat panel LCD display device. The computer 101 may further comprise or be operatively coupled to a user input device 110, for example a keyboard, mouse, keyboard, microphone, touchscreen, touchpad, or some combination of these or similar input devices. The computer 101 may be in communication with a Wide Area Network (WAN) 112, for example, the Internet, via a network interface component 108.

The computer 101 may receive data including user input from a client component 116, which may be in communication with the computer 101 via the WAN 112 or other communication network. A client component may include hardware elements similar to computer 101, but in a form factor for client use. A client device may include, for example, a personal computer, a laptop computer, a handheld computer such as a smart phone or the like, a notepad computer, or a game console. The computer 101 may provide output to the client 116 in response to user input. Generally, the computer 101 may host multiple clients, for example the second client 114, which may be configured similarly to the first client. The output may include a virtual world interface for accessing a virtual model of a place, including operating an avatar within the model, editing the model or objects contain in the model, or otherwise interacting with the virtual model. The model may be a three-dimensional (3-D) model, or a quasi-3-D model resembling a 3-D model in some respects, but limited by retaining essential characteristics of a two-dimensional model, sometime referred to as a 2-D world. In a separate aspect, the output may include video data for display on one or more surfaces, using a flat panel device, projector or other display technology, at each of the client 116 and second client 114.

Figure 2:
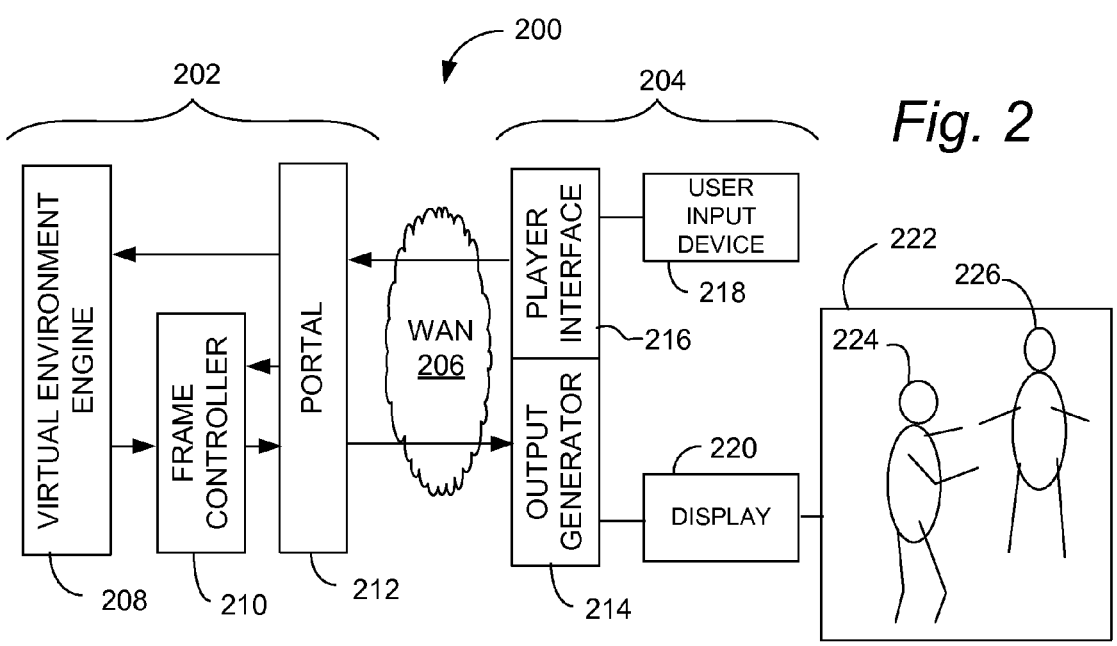
FIG. 2 is a flow chart showing further aspects of a system for adaptable generation of virtual environment frames in a multi-user virtual environment.

The system 200 shown in FIG. 2 may include one or more algorithms for performing operations of the methods described herein, stored in a memory of a virtual world server 202, which may be accessed via a wide area network 206 or other communications network or combination of networks by multiple clients 204 (one of many shown). A client 204 may comprise a single device or multiple devices linked via a user account; for example, a personal computer, laptop computer, notebook computer, notepad computer, smart phone, gaming device, or any combination of two or more of the foregoing devices controlled by a single user and connecting to the server 202 using a single user account. The client 204 may receive user input from one or more user input devices 218, for example, a keyboard, mouse or other pointing device, touchscreen, microphone, camera array (e.g., Microsoft™ Kinect™ or similar device), or other input device. The user input device 218 may provide user input signals to a player interface module, which may interpret the signals as commands or other input to a virtual environment process, and provide the command or other input to a portal component 212 of a virtual environment server 202.

The client 204, using an output generator module 214, may provide a video output signal to a display device 220, which may display one or more windows 222 showing a view of a virtual environment responsive to user input from the input device 218. The virtual environment may include a first avatar 224 operated in response to user input provided to the virtual environment server 202 by the client 204, and a second avatar 226 operated in response to a different input. The output generator module 214 may receive data from the virtual environment server 202 defining a current state of the virtual environment. The output module may generate and render video data based on the input from the server 202 using viewpoint and other display settings determined at the client device. The output module may provide a video signal to a display device. It should be appreciated that the client device 204 may also include an audio output device for outputting an audio track that is synchronized with the video output.

The virtual environment server 202 may include several interactive modules that may be implemented using one or more processors coupled to a computer memory holding program instructions. These modules may include a portal 212 that manages communication with multiple clients. The portal may authenticate users attempting to access the virtual environment, receive input from authenticated users and direct it to a virtual environment engine module 208, and direct output from a virtual environment engine module 208 via a frame controller module. The virtual environment engine module 208 may aggregate user inputs for avatar actions in the virtual environment and calculate a current output state of the virtual environment, for example using a physics model or modified physics model to simplify calculations or obtain a certain special effect. The virtual environment engine may perform the aggregation and calculation at a particular frequency, which may be referred to as a frame rate. So, for example, the virtual environment engine may cache user inputs for a period of time, for example 1/60 of a second, and the end of which the engine may use the cached input as input for a calculation of virtual environment output for a corresponding frame, reset the user input cache, and begin caching new user input for the next frame.

The virtual environment server may include a frame controller module 210, which may include one or more processors programmed to perform frame control according to the more detailed algorithms disclosed herein. Although illustrated as a separate module, it should be appreciate that the frame controller module may be integrated into another module of the virtual environment server 202. It should be further appreciated that the virtual environment server may include other modules that are not illustrated in FIG. 2.

The frame controller 210 may operate to control frame data passed to each client based on capabilities of a destination client or group of destination clients. The controller 210 is not limited to control of virtual environment frame rate only, and may control other performance-related elements of an output stream in addition to, or instead of, a frame rate. The module 210 may create multiple output streams from a single input stream received from the virtual environment engine. For example, the frame controller module 210 may include a first ("fast") output stream for client devices having high performance ratings above a defined upper threshold, a second ("slow") output stream for client devices having performance ratings below a defined lower threshold, and a third ("intermediate") output stream for client devices having performance ratings intermediate between the upper and lower threshold. Any suitable performance measure may be used, for example, a rating as produced by the Windows™ Performance Monitor in the Windows 7™ operating system, and similar benchmarks.

The frame controller module 210 may generate the multiple output streams at different frame rates based on a baseline frame rate from the virtual environment engine. The baseline or input frame rate from the engine 208 should generally be the highest rate and include the greatest amount of detail. The module 210 may further synchronize different frame rates in different output streams so that they remain synchronized over time. For a simple example, to reduce the frame rate in half the frame controller 210 may simply delete every other frame of the input steam from the engine 208. Other reduction ratios may be obtained by deleting a different proportion of frames in a regular pattern. The frame controller 210 may ensure that no critical information is deleted from an output stream by, for example, by copying any critical data from a deleted frame to an undeleted frame. In the alternative, or in addition, the engine 208 may control the output stream so that critical data is place in designated frames, for example in every $i^{th}$ fram, where "1" is an integer between 2 and 10 (or some other upper bound.) In addition to reducing frame rates, the frame controller module 210 may adjust a level of detail or number of objects, or other features included in an output stream to reduce processing demands on slower processors, as described in more detail elsewhere herein. The frame controller 210 may perform other operations as described herein to provide a customized output stream to different client devices based on the client devices' respective processing power, as described in more detail elsewhere herein.

Although depicted on the server 202, it should be appreciated that aspects of a frame controller module may be implemented on a client device to process an input stream for the client only. In such case, however, the frame controller operations on the client should be designed to cause a net decrease in demand on the client processing system. For example, a simple reduction in frame rate by deleting or ignoring every $i^{th}$ non-critical input frame may be implemented on a client device to achieve a net increase in perceived performance at the client, while more complex processing may need to be performed at a server component. In designing a system 200, a programmer may allocate performance of frame control tasks among client and server components to optimize overall performance of the system. It should be appreciated that, in general, a virtual environment client application may be downloaded to each client device to perform tasks conventionally allocated to the client side, and such applications may be modified to enable the client to perform operations in support of the methods disclosed herein.

The portal module 212 may direct different output streams from the frame controller 210 to different clients, based on a performance measure for the client. Accordingly, the portal module 212 may receive a performance report for each client, for example by manual entry of a user estimate, by automatic or semi-automatic report from a performance-measuring application operating on each client, or by some combination of the foregoing. If no performance measure is available for a particular client, the portal 210 may provide a default stream to such client.

The present technology may be used to handle generation, display, and maintenance of a virtual environment with substantial amounts of user generated content (for example, areas, textures, props, clothing, models, embedded web pages, Flash™ content, etc.) such that it is extremely difficult to effectively predict user behavior, user needs, where a user will be or what they will encounter. Existing art is unable to provide an acceptable user experience in the face of these factors. The technology allows optimization of the user experience and virtual environment, prioritizing the factors most important to the specified area and virtual environment, such as frame rate, texture resolution, quality or presence of streaming audio or video, or other elements.

In an embodiment, the loads on the server, network, and key components of the user's machine are monitored, often including the graphics card (GPU), CPU, GPU memory, and CPU memory. As the user moves the avatar into a specified area and points the avatar in a particular direction, the technology may be used to granularly change elements such as frame rate, texture resolution, quality or presence of streaming media, process priority, affinity or number of cores on the CPU and/or GPU utilized, all in order to improve performance elements that the designer and/or user desire be improved.

The technology goes beyond allowing the user to manually set various quality settings such as number of avatars to render in a virtual space, texture and screen resolution, anti-aliasing and other factors. Such static or manually elected options are insufficient to deliver an optimized performance in an unpredictable and dynamic virtual environment. Instead, a server and/or client module dynamically sets quality settings for the various elements based on the desired performance for the user even under stressful situations such as live events with many attendees, streaming video and audio feeds, complex custom textures, or other factors.

A server or client module may include a component that measures and alters the virtual environment frame rate and/or video frame rate of only certain portions of the environment. For example, an avatar engaged in virtual hunting might be presented an environment in which the rifle sight and the permissible target animals are refreshed 60 times per second, but background non-target elements, such as vehicles on a road passing in the background, may be refreshed only 15 times per second.

A server or client module may further include a component that dynamically alters the elements rendered within an environment in order to achieve a target frame rate. The alteration may include slowing the update rate for non-critical elements, hiding or simply not rendering distant or other non-critical elements, rendering non-critical elements in a static manner, or otherwise throttling the CPU/GPU/Network requirements by altering the rendering and/or updating strategies.

One application of the technology is illustrated using a limited subset of the Utherverse VWW virtual environment as follows: A virtual environment is provided with a large stadium capable of holding a sufficiently large number of avatars that the rendering capabilities of many user machines may be exceeded. The environment also contains a virtual café with a much smaller capacity, a virtual movie theater configured for 1080P high definition streaming, and a street area that varies in population and configuration as users alter elements. The large stadium may be configured to prioritize first streaming content from the stage, then communication between avatars near other avatars, then rendering of the largest number of avatars possible without degrading their textures or appearance beyond a set point. A target minimum frame rate of 60 frames per second may be set when the user is viewing the stage (or for a certain area of the stage only) and a target minimum frame rate for other elements may be set to 20 frames per second. A user entering the large stadium may enter via a side door and naturally have in her field of view only 10 other avatars. The frame rate, rendering quality, and number of avatars may at that point not be limited by resource constraints. As the user turns toward the stage, the number of avatars visible may increase to 100, but the stage is not yet populated. The target frame rate for an empty stage may be the same as the other content, and the system may decrease the number of avatars visible to equal the largest number of nearby avatars possible without degrading frame rate below 20 frames per second or rendering quality below the target. As the pre-concert music begins to stream in, the number of avatars visible may be reduced to accommodate the extra requirements for rendering the streaming music. When the band takes the stage, the more distant avatars are no longer displayed, although it may sometimes be preferable to slowly dissolve or fade the more distant avatars to prevent a visually distracting or discontinuous effect. The target frame rate when viewing the stage may increase to 60, and the rendering quality and number of other elements may be reduced until the target frame rate is achieved. If the user turned her avatar to face another avatar operated by a friend, and the stage therefore become no longer visible according to her new point of view, the system may display more avatars in the distance as the rendering requirements for the stage may no longer be in place.

If the user then navigates the avatar to a different part of the virtual environment, for example to the café, the rules may be set differently, perhaps prioritizing high quality rendering of art props. For example, if the café had hanging virtual art that was for sale, either as a virtual object or as a real world object corresponding to the virtual object, rendering of the art may be given a high priority. In such a case, a lower frame rate might be allowed in order to permit higher quality rendering. The importance of inter-avatar communication in such an environment might be heightened, in which case nearby avatars might be rendered in a higher quality, or, during communication, at a higher frame rate.

For further example, for an avatar attending a virtual movie theater, a rule set implemented by a frame controller module at the server and/or client may prioritize streaming at the maximum resolution of the user display. For example, a user with a 1280×1024 monitor may be set to receive less than the full 1920×1080 quality possible with 1080P content. The rule set may further specify that the virtual environment frame rate match the source frame rate for the streaming media. For example, movies may stream at 24 frames per second while sports might stream at 60 frames per second. In such a case, when the user computer (or server) is incapable of supporting high resolution avatar textures and a large number of props and avatars concurrently with streaming content, the frame controller component reduces the texture quality and number of props and avatars until the target frame rate and resolution can be achieved for the streaming content. The rules may also be configured so that there are minimum qualities below which otherwise prioritized content is served at a lower quality—for example, the illusion of a virtual environment is lost if no props or avatars are rendered, so a minimum number of props or avatars might be prioritized above the highest quality rendering of the streamed content.

All of the rule sets implemented by a frame controller component may be configurable by the client or by the designer of the virtual environment. It may be desirable for friends, associates, or other avatars or elements identified by the user to be granted priority. So using the theater example, a user might attend a movie with her friend, and the friend may be prioritized, and thus always rendered, and where possible rendered at a higher quality, than a non-affiliated avatar or element.

Using the example of the street area, the avatar may enter the street area. The user in such a case may encounter varying elements, events, and strains on the user's system. For example, the street may be relatively deserted and then a movie ends and numerous avatars enter the street. During planned events, such as a parade, the background rules may be temporarily altered to prioritize different elements. During unplanned events, the nature of the event or environmental conditions may be compared to a database of events or conditions for which there are established rule sets for frame control, and the best matching rule set utilized. The changes users make to the rule set in response to the event may also be retained in a database for use, either directly or as part of a heuristic or even averaging approach to developing rules for later, similar events or conditions.

In circumstances where the user is in proximity to other affiliated users (such as friends participating in a virtual environment from clients placed at the same location, people on a date, or similar situations), the processes running on the affiliated user machines may communicate their current rule sets for frame control and actual rendering and conditions so that the users may opt to experience the event with nearly identical conditions. As an example, if a soldier is deployed overseas and is dating another soldier stationed on a base in the U.S., they may desire to go to a virtual art show and concert together. The overseas soldier may have a more powerful computer, but the domestic soldier may have a higher speed network connection. The quality of the streaming content may be reduced for both users to the highest level that the overseas soldier may be able to obtain. Similarly, the number of avatars and the quality of the artwork rendered may be reduced to the maximum quality that the overseas soldier's computer could render. Optionally, a selectable signal may be provided to a client device where the frame rate or quality is being intentionally degraded so that the user can opt to turn off the degradation, losing a portion of the shared experience in the process. Such a selectable option may also enable a user to only tie certain elements to the maximum capability of affiliated users, while setting other elements independently. For example, frame rate may be desirable to set independently, while the level of detail or other appearance factor may be shared. The system may further provide an option for delivering an experience for one or more elements within a defined similarity to the experience of the other user, for example asking that the streaming content be delivered within 25% of the resolution delivered to the other user. In an embodiment, the number of avatars and other virtual environment items visible to affiliated users may be kept nearly identical. In another implementation, the user processes may communicate with each other as to the actual identities of the avatars and other elements being rendered, so that each user sees the same avatars and elements as the other. To implement this variant, the server may generate the visible avatars and elements from a point approximately midway between the locations of the affiliated avatars.

The use of a dynamic rule set for granular adjustments by a frame controller component is preferably implemented in conjunction with user preferences that allow alterations to the rule set by the user. This is particularly important within a virtual 3D environment where different humans perceive different elements as critical to creating a realistic environment. For example, certain users may become motion sick with a low frame rate, and for those users, viewing 2D content (such as a movie) within a 3D environment may be unpleasant unless the 3D elements are rendered at a higher frame rate, even if that means that the 2D elements are rendered at a lower resolution. Similarly, certain users may have a preferred use for the environment, such as virtually skateboarding through the environment, and may need to default to a higher frame rate even in areas where a user navigating on virtual foot may prefer a higher resolution or rendering quality.

In an embodiment, a component implements a slow transition between rule sets, so that there are no jarring visual discontinuities as avatars drop in quality or number, for example, in an unrealistic manner. One method for avoiding jarring transitions may take advantage of shifts in the field of vision for the avatar. So, for example, if the software determines that the number of avatars must be reduced because the frame rate is below target, the software may delay the reduction, or slowly implement the reduction. When the avatar turns to face a different direction, however, the reduction may be fully (or more rapidly) implemented, as avatars drop out of the natural field of view of the avatar and new areas come into the field of view. For example, if the software needed to reduce the number of visible avatars to 20 or fewer to maintain the frame rate, when the avatar turned to face a friend to her left, avatars on the right may naturally disappear from view. As the new area is drawn, fewer avatars may be rendered. When the avatar turned back to the right, the excess avatars may not be rendered.

In an embodiment, the virtual environment server may prioritize avatars and elements by distance from the user, which may be customized for a client or group of clients using a frame controller module. More distant avatars and elements may be removed before closer elements such as in level of detail control. In this implementation, the frame controller component may implement a different level of detail rule set based on a defined performance class of a client device or group of client devices.

In the alternative, or in addition, a frame controller component may alter the perspective or distances within the virtual world to move avatars and elements to an apparently more distant place, thus allowing rendering at a lower quality or lower refresh rate without degrading the user experience. Using the street scene as an example, avatars may be positioned on second story balconies or behind second story windows. Even a minor increase in building height may make those avatars more distant and thus require fewer resources to render textures and other elements. In an aspect of this feature, a virtual environment server may slowly change a perspective or location of avatars in a scene, and an maintain perspective changes at sufficiently small increments per frame so as to minimize detracting from a general verisimilitude of the environment. Alternatively, perspective changes may be made more aggressively, for example to minimize the time required to bring operating parameters closer to target.

Generally, it may be desirable to use web cams or other technology capable of following, observing or predicting eye movement in the user. Changes to rendering rules may preferably be implemented first, or at least more rapidly, in areas that are not currently being viewed by the actual user, or are not the clear area of focus of the actual user, even if the user is capable of seeing them in peripheral or non-central areas of vision. This may be combined with more rapidly implementing rule changes when the avatar looks away from an area to maximize the speed with which rendering changes are implemented. Because such user feedback is necessarily user-specific, a system may be designed to implement this feature at the client level. In an alternative, an output stream by be configured to produce multiple output streams depending on a general area of user focus, for example, center, upper left, upper right, lower right, or lower left. Then, a portal component of an environment server may select an appropriate output stream based on feedback from the client indicating an area of focus. A client application may track eye movements at the client device and report a general focus area periodically to the portal component, for example, every ¼ or ½ second.

In another aspect, a system may be configured to use distributed rendering to move rendering tasks away from stressed components. While this may be done within a local area network or across a WAN, in a peer-to-peer implementation clients with extra computer capacity may be enabled to share that capacity with clients whose computing components are stressed. An accounting system may be used to track borrowed rendering capability and to change money, virtual currency, or computing time as a method for compensating the user for sharing computing power. A barter system is anticipated to be a method preferred by users, wherein individual users agree to share computing power, preferably without a strict accounting between them. To better facilitate such a system, users with similar usage patterns, computing devices, network connections, or geographic locations may be paired or grouped. A processing sharing system may be constrained by the speed of network connections between cooperating peers, which may be tracked and used to control the degree to which processing power is distributed. For example, a peer device with surplus processing power may be user to process every $i^{th}$ virtual environment frame, to the extent that the time T required for the consuming client to obtain each processed $i^{th}$ frame from the peer client and integrate it into a output video stream for display is reliably less than $i/kR$, where i is an integer, k is a margin of reliability factor set at one or greater, and R is the frame rate per unit time. Thus, for example, a peer processing system may measure T and calculate i accordingly based on known values of k and R for a shared peer-to-peer processing implementation.

A variant is for task sharing between users viewing the same scene (such as the associated avatars of the affiliated users described above). For example, associated avatars where the rendering rules are merged to create a shared experience could split the rendering tasks, with each user rendering some of the elements for the user. Contrary to simply distributing computing power, such a shared rendering technique means that the perspectives of each avatar may be considered in determining what tasks to share, since the 3D special relationships between avatars and items mean that an item rendered from the perspective of one avatar is not necessarily one that will appear properly for an avatar viewing from another perspective. To illustrate this problem, for example using in a simple scene where a couple of avatars, designated "A-Avatar" and "B-Avatar", may be modeled sitting in virtual chairs 3 feet apart, facing in the same direction, in a virtual coffee house, both facing a stage, with A-Avatar on the left. Distant items on the stage may appear nearly identical (or, given sufficient distance and low enough resolution, actually identical) to both avatars. However, an item three feet in front and three feet to the left of A-Avatar is rendered quite differently for B-Avatar, for whom the same object is 3 feet in front but six feet to the left. In an embodiment, using this example for illustration only, a server component may determine using a geometric calculation the amount of distortion to proper perspective caused by simply inserting an item that A-Avatar rendered from its perspective into the display for B-Avatar. A rule set is may then be applied by a frame controller component whereby an amount of acceptable distortion for a frame is compared to the predicted distortion caused by simply importing a rendered object from a neighboring avatar's perspective. Where the amount of distortion is less than that provided for by the rule set, and where the other benefits of such imported rendering of the object outweigh the costs, the frame controller component may provide an output stream that avoids rendering from the second perspective. For example, if the network connection is nearing a target maximum, component may determine that the costs may be high, or conversely if nearing GPU capacity, the benefits may be high. The frame controller component may make a determination as to whether to share rendering tasks in this manner according to whatever formula is adopted, including a set formula, one modifiable by the user or operator, or one that varies according to situation. The network lag time and differences in processing speeds may also to be weighed by a frame controller component in determining whether there is a net benefit or cost, in light of the reduction in verisimilitude caused by differential rendering speeds for certain elements. To reduce this risk, local rendering or display of objects may be delayed or degraded (or even sped up or improved) to better match the locally and remotely rendered objects in quality and speed of appearance and response. Implementation of this system may be made on a peer-to-peer basis between the client nodes, allowing the clients to negotiate task sharing in a manner that dynamically varies with the current network bandwidth and computer processing capabilities of the respective client devices.

A monitoring element that constantly provides feedback to the software processes and/or to the server or client device may be included in the system 200. The monitoring element may monitor rendering quality, frame rates, and other elements related to the quality of the virtual environment simulation, as well as monitoring the strain that system, server, and network resources are operating under. A frame controller component may adjust frame rate or other elements of output streams in response to the monitoring feedback, for example by reducing frame rates or level of detail slightly for all output streams, in response to monitoring indicating an undesirably high level of system strain. System strain may be defined using various metrics, for example, a proportion of participating client devices that have apparently lost synchrony with the virtual environment process.

In another variant, a client device or server component may pre-render elements in the virtual environment based on anticipated need for a client or group of client devices. For example, a client device controlling an avatar that is modeled as walking toward a crowded street scene but has not yet arrived may be using only 10% of the client computer's capacity. The computer may anticipate a need for elements in the street scene, identical the most likely travel paths and eye direction, and utilize some or all of the remaining 90% of capacity to pre-render the elements in the scene least likely to move. Avatars themselves may be poor candidates for pre-rendering due to unpredictable movement, but static elements such as walls or system-controlled velocity objects may be better candidates since they don't move or move in a predictable fashion. Avatars and other elements that have not recently moved may be pre-rendered as well, optionally after the pre-rendering of the more reliably predicted elements is complete. To maximize the likelihood that such pre-rendering will be useful, and to minimize the amount of perspectives that pre-rendering is required for, an avatar, upon entering a pre-rendered area, may have constraints placed on movement. The constraints may be absolute (i.e. you may walk only along one or several set paths), or may be made imperceptible or minor limitations to control whereby the user has to exert more than the normal amount of control input to cause a movement outside of the pre-rendered area. This may prevent, for example, normal accidental "wobble" that takes place in moving an avatar from causing the avatar to "wobble" in a manner that causes the pre-rendered elements to need to be rendered from a different perspective. Previous "wobble" patterns from the same avatar may optionally be used in designing the preferred and limited path of the avatar to make the avatar appear to be moving as if controlled by a human. For example, a virtual environment server may reproduce a wobble that an avatar normally has, because human-controlled avatars don't normally walk in a precisely straight robotic-type line.

Without detriment to the detailed algorithms for performed by one or more computers as described above, methodologies that may be implemented in accordance with the disclosed subject matter, may be further understood with reference to various flow charts illustrating aspects of the foregoing algorithms in summary form. For purposes of simplicity of explanation, methodologies are shown and described as a series of acts in blocks, but the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable machine (e.g., device, system, process, or component). Additionally, it should be further appreciated that methodologies disclosed throughout this specification are capable of being stored as encoded instructions and/or data on non-transitory computer-readable medium to facilitate transporting and transferring such methodologies to various devices.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

A server for a virtual world environment may perform a method 300 for adaptable generation of virtual environment frames, as shown in FIG. 3. The method 300 may include, at 302, identifying, by a computer, a target frame rate of virtual environment output, the output comprising a known number of virtual objects modeled in the virtual environment and included in the output to be transmitted to a client device. The output may comprise data defining a current state of virtual environment at a point in time determined by a most recent refresh cycle. The refresh cycle may occur at an original or baseline frame rate. The virtual objects may be referred to in the data and be partially defined by the output data, while other aspects of the virtual objects may be defined in a separate memory location. For example, a server may provide data defining an identified object's location, orientation, or other feature of a present transitory state for the object, while more permanent aspects of the object, for example its geometrical or armature properties may be retained in a memory of a client device and in the memory of the server, but need not be included in the virtual environment output.

The method 300 may further include, at 304, determining, by the computer, whether a maximum frame rate at which the client device is capable of displaying the virtual environment output is less than the target frame rate. The maximum frame rate may be determined by user input or by performance measurement of some kind, as described elsewhere herein. The target frame rate may be the same for all devices within a particular class of client devices, but may vary depending on common factors such as network conditions. The target frame rate may vary depending on the class of the client device based on capability criteria.

The method 300 may further include, at 306, modifying, by the computer, a number of objects in the virtual environment output to prepare modified output configured for achieving the target frame rate at the client device, in response to determining that the maximum frame rate is less than the target frame rate. For example, the computer may remove one or more identifiers and related transient state data for one or more objects from the virtual environment data directed to a particular client device or group of client devices. Thus, the client or group may avoid the processing overhead required to generate and render an output video frame that includes the removed object. This may, in turn, enable the client or client group to achieve the target frame rate. The achieved frame rate may be reported to the server and the number or type of objects removed may be adjusted accordingly. It should be appreciated that omitting objects that would otherwise be included from the output based on feedback to achieve the target frame rate is functionally equivalent to removing such objects, and may also be performed.

FIGS. 4-5 show further optional operations or aspects 400 or 500 that may be performed by the server in conjunction with the method 300, or in some cases independently of said method. The operations shown in FIGS. 4-5 are not required to perform the method 300. The operations are independently performed and not mutually exclusive. Therefore any one of such operations may be performed regardless of whether another downstream or independent upstream operation is performed. If the method 300 includes at least one operation of FIGS. 4-5, then the method 300 may terminate after the at least one operation, without necessarily having to include any subsequent downstream operation(s) that may be illustrated.

As shown in FIG. 4, the method 300 may include one or more of the additional operations 400. In an aspect, the method 300 may include, at 402, selecting objects for removal in order of a predetermined priority. The priority may be predetermined based on a hierarchical scheme customized for each user. For example, the server may designate each user's avatar as of the highest priority for that user, followed by critical elements required to maintain verisimilitude of the environment, followed by favorite objects designated by a user expressly or implicitly (e.g., accessories, avatars of designated friends, etc.), followed by avatars of unrelated persons, followed by inanimate objects belonging to other persons, and so forth.

It may sometimes be desirable to limit the removal of objects. The method 300 may further include, at 404, retaining all objects having priority above a threshold value in the modified output, regardless of whether or not the client device can achieve the target frame rate for the modified output. In another aspect, the method may include, at 406, determining which objects to remove from the virtual environment output at least in part based on a virtual distance between each of the objects and an avatar for a current user of the client device. More detailed aspects and algorithms for selected objects to be effectively removed from an output stream have been disclosed in more detail above, and need not be repeated here.

As shown in FIG. 5, the method 300 may include one or more of the additional operations 500. In an aspect, the method 300 may include, at 502, defining the target frame rate in response to user input to the client device. For example, a user may provide an indication of a desired target frame rate by interacting with a user interface component of a client application. The client application may provide the indication to a server component, which may execute the modification to the output.

In another aspect, the method 300 may further include, at 504, modifying the target frame rate for at least one client, by periodically removing a non-critical frame from the virtual environment output to prepare the modified output. The server may provide certain designated frames as including enhanced but non-critical data, or may flag critical data within each frame. Critical data may include, for example, information that is necessary at the client device to maintain continuity of the virtual environment. Mere gradual changes in position are not generally critical, but the reporting of certain events triggering changes that cannot be interpolated from other data may be critical. For example, text dialog may be critical is supplied in only one refresh cycle, or a change in avatar state such as an aware of points or the like may be critical. Whether or not particular information is critical will depend on system design. In any case, the modification process, when removing frame data, may use an algorithm to identify frames marked as non-critical for removal, or may process each frame to identify critical data on the fly.

In another aspect, the method 300 may further include, at 506, defining the target frame rate differently for different client devices based on maximum frame rates for respective ones of the different client devices. As previously noted, the target frame rate need not be the same for all client devices or for all classes of client device. In a related aspect, the method 300 may further include, at 508, serving multiple output streams according to different target frame rates for the respective ones of the different client devices. For example, a first client may be served an a first output stream at a target rate equal to the baseline (maximum) frame rate available at the virtual environment server. A second client may be served a second output stream at one-half (or some other fraction) of the baseline rate, by removal of non-critical frames. The method 300 may further include, at 510, synchronizing the different target frame rates to a baseline frame rate of the virtual environment output. Continuing the foregoing example, if the frame rate of the first output stream is 60 cycles per second, by removing every other frame a synchronized output stream having a designated frame rate of 30 cycles per second may be provided to the second client. Both output streams share every other data frame, which may include all critical data. So long as both the first and second clients are able to achieve the respective target frame rates of 60 and 30 cycles per second, the virtual environment experience will remain synchronized at both clients. However, the first client will experience smoother animation. The server may treat input from both clients with the same priority, regardless of the different output rates, so that neither client enjoys any time advantage in the input of data to the virtual environment process.

With reference to FIG. 6, there is provided an exemplary apparatus 600 that may be configured virtual environment server operating a virtual environment application, or as a processor or similar device for use within the virtual environment server, for adaptable generation of user frames in response to client feedback. The apparatus 600 may include functional blocks that can represent functions implemented by a processor, software, or combination thereof (e.g., firmware).

In one embodiment, the apparatus 600 may include an electrical component or module 612 for identifying a target frame rate of virtual environment output, the output comprising a known number of virtual objects modeled in the virtual environment and included in the output to be transmitted to a client device. For example, the electrical component 612 may include at least one control processor 602 coupled to one or more memory components 604 with instructions for identifying a target frame rate. The electrical component 612 may be, or may include at least one control processor 602 operating an algorithm. The algorithm may operate in an application to perform detailed operations for identifying a target frame rate of virtual environment output, for example as described in connection with FIG. 3 above. The component may include other aspects, such as the hardware and software components illustrated in FIGS. 1-2 or otherwise disclosed above for providing virtual environment output comprising a known number of virtual objects modeled in the virtual environment, and for identifying a target frame rate of virtual environment output.

The apparatus 600 may include an electrical component 614 for determining whether a maximum frame rate at which the client device is capable of displaying the virtual environment output is less than the target frame rate. For example, the electrical component 614 may include at least one control processor 602 coupled to a memory 604 holding instructions for determining whether a maximum frame rate at which the client device is capable of displaying the virtual environment output is less than the target frame rate according to more detailed algorithms described herein. The electrical component 614 may be, or may include, the at least one control processor 602 operating an algorithm. The algorithm may include, for example, receiving performance feedback from a client device or for a class of client devices, defining a maximum frame rate based on the performance feedback, and comparing the maximum frame rate to a previously determined target frame rate for the device or class of devices to which the client device belongs. Said component 614 may include other aspects for determining whether a maximum frame rate at which the client device is capable of displaying the virtual environment output is less than the target frame rate, such as the hardware and software components illustrated in FIGS. 1-2 or described elsewhere herein.

The apparatus 600 may include an electrical component 616 for modifying a number of objects in the virtual environment output to prepare modified output configured for achieving the target frame rate at the client device, in response to determining that the maximum frame rate is less than the target frame rate. For example, the electrical component 616 may include at least one control processor 602 coupled to a memory 604 holding instructions for modifying a number of objects in the virtual environment output to prepare modified output configured for achieving the target frame rate at the client device, in response to determining that the maximum frame rate is less than the target frame rate. The electrical component 616 may be, or may include, the at least one control processor 602 operating an algorithm. The algorithm may operate in a processor of a server or client computer to identify and remove one or more identifiers and related data for one or more lowest-priority objects from the virtual environment output to be provided to the client device, for example using a data filtering process. In an alternative, the algorithm may operate to omit the one or more identifiers and related data for one or more lowest-priority objects from being placed in the virtual environment output to be provided to the client device. Said component may include other aspects for modifying a number of objects in the virtual environment output to prepare modified output configured for achieving the target frame rate at the client device, in response to determining that the maximum frame rate is less than the target frame rate, such as the hardware and software components illustrated in FIGS. 1-2 or elsewhere herein.

The apparatus 600 may include similar electrical components for performing any or all of the additional operations 400 or 500 described in connection with FIGS. 4-5, which for illustrative simplicity are not shown in FIG. 6.

In related aspects, the apparatus 600 may optionally include a processor component 602 having at least one processor, which in the case of the apparatus 600 may be configured as a virtual environment hosting component and optionally incorporated into a network server. The processor 602 may be in operative communication with the components 612-616 or similar components via a bus 610 or similar communication coupling. The processor 602 may effect initiation and scheduling of the processes or functions performed by electrical components 612-616. The processor 602 may encompass the components 612-616, in whole or in part. In the alternative, the processor 602 may be separate from the components 612-616, which may include one or more separate processors.

In further related aspects, the apparatus 600 may include a network interface component 608, for communicating with multiple clients over a network. The apparatus 600 may include an input/output port 608 for receiving input for administrative control of the virtual environment process and providing a monitoring output for administrative purposes. The apparatus 600 may include a component for storing information, such as, for example, a memory device/component 604. The computer readable medium or the memory component 604 may be operatively coupled to the other components of the apparatus 600 via the bus 610 or the like. The memory component 604 may be adapted to store computer readable instructions and data for performing the activity of the components 612-616, and subcomponents thereof, or the processor 602, or the additional aspects 400 or 500, or other methods and operations disclosed herein. The memory component 604 may retain instructions for executing functions associated with the components 612-616. While shown as being external to the memory 604, it is to be understood that the components 612-616 can exist within the memory 604.

In another aspect of the technology, a client device may perform certain operations in cooperation with a server computer that provides virtual environment data. For example, a client computer may perform a method 700 as shown in FIG. 7. The method 700 may include, at 702, setting, by a client device comprising a computer, a target frame rate for virtual environment data received from a server, the data comprising a known number of virtual objects modeled in the virtual environment and included in the data received from the server. The method 700 may further include, at 704, determining, by the client device, whether a maximum frame rate at which the client device is capable of displaying the virtual environment data is less than the target frame rate, for at least one portion of the data. The method 700 may further include, at 706, modifying, by the client device, a number of objects in the virtual environment data to prepare modified data configured for achieving the target frame rate at the client device, in response to determining that the maximum frame rate is less than the target frame rate. The method 700 may include other aspects and operations as described in more detail elsewhere herein, for example in connection with FIGS. 1-5 with respect to a client device or optionally by a client device.

With reference to FIG. 8, there is provided an exemplary apparatus 800 that may be configured as a client receiving from a virtual environment server operating a virtual environment application, or as a processor or similar device for use within the client device, for adaptable generation of user frames in response to client feedback. The apparatus 800 may include functional blocks that can represent functions implemented by a processor, software, or combination thereof (e.g., firmware).

In one embodiment, the apparatus 800 may include an electrical component or module 812 for setting a target frame rate for virtual environment data received from a server, the data comprising a known number of virtual objects modeled in the virtual environment and included in the data received from the server. For example, the electrical component 812 may include at least one control processor 802 coupled to one or more memory components 804 with instructions for setting a target frame rate. The electrical component 812 may be, or may include at least one control processor 802 operating an algorithm. The algorithm may operate in an application to perform detailed operations for setting a target frame rate and for using the data comprising a known number of virtual objects modeled in the virtual environment to generate a display output. The component may include other aspects, such as the hardware and software components illustrated in FIGS. 1-2 or otherwise disclosed above for using virtual environment output comprising a known number of virtual objects modeled in the virtual environment, and for setting a target frame rate of virtual environment output.

The apparatus 800 may include an electrical component 814 for determining whether a maximum frame rate at which the client device is capable of displaying the virtual environment data is less than the target frame rate, for at least one portion of the data. For example, the electrical component 814 may include at least one control processor 802 coupled to a memory 804 holding instructions for determining whether a maximum frame rate at which the client device is capable of displaying the virtual environment output is less than the target frame rate according to more detailed algorithms described herein. The electrical component 814 may be, or may include, the at least one control processor 802 operating an algorithm. The algorithm may include, for example, measuring performance at the client device or receiving user input defining client performance characteristics, defining a maximum frame rate based on the performance information, and comparing the maximum frame rate to a previously determined target frame rate for the client or class of devices to which the client device belongs. Said component 814 may include other aspects for determining whether a maximum frame rate at which the client device is capable of displaying the virtual environment output is less than the target frame rate, such as the hardware and software components illustrated in FIGS. 1-2 or described elsewhere herein.

The apparatus 800 may include an electrical component 816 for modifying a number of objects in the virtual environment output to prepare modified output configured for achieving the target frame rate at the client device, in response to determining that the maximum frame rate is less than the target frame rate. Other aspects of the component 816 may be as described for component 616 of the apparatus 600 shown in FIG. 6.

The apparatus 800 may include similar electrical components for performing adapted ones of the additional operations 400 or 500 described in connection with FIGS. 4-5, th the extent possible applicable for a client device, which for illustrative simplicity are not shown in FIG. 8.

In related aspects, the apparatus 800 may optionally include a processor component 802 having at least one processor, which in the case of the apparatus 800 may be configured as a client device and may include a client application for providing virtual environment output from aggregate data provided from a virtual environment server. The processor 802 may be in operative communication with the components 812-816 or similar components via a bus 810 or similar communication coupling. The processor 802 may effect initiation and scheduling of the processes or functions performed by electrical components 812-816. The processor 802 may encompass the components 812-816, in whole or in part. In the alternative, the processor 802 may be separate from the components 812-816, which may include one or more separate processors.

In further related aspects, the apparatus 800 may include a network interface component 808, for communicating with multiple clients over a network. The apparatus 800 may include an input/output port 808 for receiving input for administrative control of the virtual environment process and providing a monitoring output for administrative purposes. The apparatus 800 may include a component for storing information, such as, for example, a memory device/component 804. The computer readable medium or the memory component 804 may be operatively coupled to the other components of the apparatus 800 via the bus 810 or the like. The memory component 804 may be adapted to store computer readable instructions and data for performing the activity of the components 812-816, and subcomponents thereof, or the processor 802, or other methods and operations disclosed herein for performance by a client device. The memory component 804 may retain instructions for executing functions associated with the components 812-816. While shown as being external to the memory 804, it is to be understood that the components 812-816 can exist within the memory 804.

The steps of a method or algorithm described in connection with the disclosure herein may be embodied directly in hardware, in a software module executed by a processor, or in a combination of the two. In one or more exemplary designs, the functions described may be implemented in hardware, software, firmware, or any combination thereof. If implemented in software, the functions may be stored as one or more instructions or code on a computer-readable medium. A software module may reside in a non-transitory computer readable medium, for example, RAM memory, flash memory, ROM memory, EPROM memory, EEPROM memory, registers, magnetic media (e.g., hard disk or tape), and optical medium (e.g., a removable optical disc such as DVD or Blu-Ray), or any other form of computer-readable storage medium known in the art. An exemplary storage medium may be coupled to the processor such that the processor can read information from, and write information to, the storage medium. In the alternative, the storage medium may be integral to the processor.

The foregoing examples illuminate certain aspects of the present technology. The scope of the present technology may extend beyond these examples in both details and generalities within the scope of the present disclosure.

What is claimed is:

1. A method for adaptable generation of virtual environment frames in a virtual environment by a computer, comprising:

identifying, by a computer, a target frame rate of virtual environment output, the output comprising a known number of virtual objects modeled in the virtual environment and included in the output to be transmitted to a client device;

determining, by the computer, whether a maximum frame rate at which the client device is capable of displaying the virtual environment output is less than the target frame rate; and modifying, by the computer, a number of objects in the virtual environment output to prepare modified output configured for achieving the target frame rate at the client device, in response to determining that the maximum frame rate is less than the target frame rate, wherein each of the objects is one of an avatar or a non-avatar prop and the modifying comprises selecting the each of the objects for removal in order of a predetermined priority based on a hierarchical scheme customized for each user.

2. The method of claim 1, further comprising retaining all objects having priority above a threshold value in the modified output, regardless of whether or not the client device can achieve the target frame rate for the modified output.

3. The method of claim 1, wherein the objects comprise at least one avatar displayed within the virtual environment subject to having its display status altered in order to achieve a target frame rate.

4. The method of claim 1, wherein the objects comprise at least one non-avatar prop displayed within the virtual environment subject to having its display status altered in order to achieve a target frame rate.

5. The method of claim 1, further comprising determining which objects to remove from the virtual environment output at least in part based on a virtual distance between each of the objects and an avatar for a current user of the client device.

6. The method of claim 1, further comprising defining the target frame rate in response to user input to the client device.

7. The method of claim 1, further comprising modifying the target frame rate for at least one client, by periodically removing a non-critical frame from the virtual environment output to prepare the modified output.

8. The method of claim 7, further comprising defining the target frame rate differently for different client devices based on maximum frame rates for respective ones of the different client devices.

9. The method of claim 8, further comprising serving multiple output streams according to different target frame rates for the respective ones of the different client devices.

10. The method of claim 9, further comprising synchronizing the different target frame rates to a baseline frame rate of the virtual environment output.

11. An apparatus comprising a processor and a memory coupled to the processor; wherein the memory holds program instructions, that when executed by the processor, causes the apparatus to:
    identify a target frame rate of virtual environment output, the output comprising a known number of virtual objects modeled in the virtual environment and included in the output to be transmitted to a client device;
    determine whether a maximum frame rate at which the client device is capable of displaying the virtual environment output is less than the target frame rate;
    modify a number of objects in the virtual environment output to prepare modified output configured for achieving the target frame rate at the client device, in response to determining that the maximum frame rate is less than the target frame rate, wherein each of the objects is one of an avatar or a non-avatar prop; and
    select the each of the objects for removal in order of a predetermined priority based on a hierarchical scheme customized for each user.

12. The apparatus of claim 11, wherein the memory holds further program instructions for retaining all objects having priority above a threshold value in the modified output, regardless of whether or not the client device can achieve the target frame rate for the modified output.

13. The apparatus of claim 11, wherein the memory holds further program instructions for determining which objects to remove from the virtual environment output at least in part based on a virtual distance between each of the objects and an avatar for a current user of the client device.

14. The apparatus of claim 11, wherein the memory holds further program instructions for modifying the target frame rate for at least one client, by periodically removing a non-critical frame from the virtual environment output to prepare the modified output.

15. The apparatus of claim 11, wherein the memory holds further program instructions for sharing rendering of the modified output between peer client devices to enable a client device to realize the target frame rate.

16. A method for adaptable generation of virtual environment frames in a virtual environment by a client device, comprising:
    setting, by a client device comprising a computer, a target frame rate for virtual environment data received from a server, the data comprising a known number of virtual objects modeled in the virtual environment and included in the data received from the server;
    determining, by the client device, whether a maximum frame rate at which the client device is capable of displaying the virtual environment data is less than the target frame rate, for at least one portion of the data; and
    modifying, by the client device, a number of objects in the virtual environment data to prepare modified data configured for achieving the target frame rate at the client device, in response to determining that the maximum frame rate is less than the target frame rate, wherein each of the objects is one of an avatar or a non-avatar prop and the modifying comprises selecting the each of the objects for removal in order of a predetermined priority based on a hierarchical scheme customized for each user.

17. The method of claim 16, further comprising determining which objects to remove from the virtual environment data at least in part based on a virtual distance between each of the objects and an avatar for a current user of the client device.

* * * * *